US007891626B2

(12) United States Patent
Lindberg et al.

(10) Patent No.: US 7,891,626 B2
(45) Date of Patent: Feb. 22, 2011

(54) ENGINE SUPPORT SYSTEM

(75) Inventors: John Nicholas Lindberg, Mankato, MN (US); Timothy M. Firzlaff, Mankato, MN (US); Scott Peder Opsahl, Lakeville, MN (US); Eric Donald Adamson, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 830 days.

(21) Appl. No.: 11/790,145

(22) Filed: Apr. 24, 2007

(65) Prior Publication Data

US 2008/0265124 A1 Oct. 30, 2008

(51) Int. Cl.
*B42F 13/00* (2006.01)
*B23Q 1/00* (2006.01)

(52) U.S. Cl. ......................... 248/340; 248/671; 269/46; 269/74; 269/902

(58) Field of Classification Search ................. 248/340, 248/671, 172; 254/133 R, 134; 269/50, 269/46, 60, 71, 74, 76, 77, 82, 902
See application file for complete search history.

(56) References Cited

U.S. PATENT DOCUMENTS 2,903,258 A * 9/1959 Jovanovich ................. 269/296
3,702,197 A * 11/1972 Sellers ....................... 280/502
4,030,705 A * 6/1977 Bontrager ................... 254/264
4,444,364 A * 4/1984 Dahl et al. ............... 242/596.7
4,549,366 A * 10/1985 Gerding et al. ............ 38/102.2
4,774,386 A * 9/1988 Goodwin .................... 180/298
6,435,360 B1 * 8/2002 Buchmeier .................. 212/180
6,666,442 B1 * 12/2003 Ploeger et al. ................ 269/46

OTHER PUBLICATIONS

Conventional Art; 1724 Engine Support Bar.
Conventional Art; Astro Engine Support Bar. AST5480.
Conventional Art; Astro Engine Support Bar.
Conventional Art; Norco Engine Support Bar.
Conventional Art; Norco Engine Support Bar. 78096A.
Conventional Art; Sunex Engine Support Bar. SUN5207.
Eagle Equipment; Astro Engine Support Bar 7900.
Norco Model: 78096A1; pp. 1-3.
Norco 3 Point Engine Support Bar, Imported; pp. 1-2.
Sunex International Sun5207 Engine Transverse Bar with Arm Support, 2006 ToolFetch.com (1 page).
SPX Corporation, "Parts List & Operating Instructions for: Three Bar Engine Support," Nov. 4 2005, pp. 1-3, SPX Corporation, Owatonna, MN, USA.

* cited by examiner

*Primary Examiner*—Anita M King
(74) *Attorney, Agent, or Firm*—Baker & Hostetler LLP

(57) ABSTRACT

A support method and system includes a main tubular member and, alternatively, an auxiliary tubular member positioned on and in substantially transverse relation to the main tubular member. A plurality of moveable base support members are located along one or more of the main tubular member and the auxiliary tubular member to selectively position the base support members on one or more of the main tubular member or the auxiliary tubular member to support the support system on a structure. A plurality of hook support members are located on and are selectively moveable along one or more of the main tubular member or the auxiliary tubular members to selectively position the hook support members on one or more of the main tubular member or the auxiliary tubular member to communicatively engage with a load associated with the structure.

12 Claims, 9 Drawing Sheets

ENGINE SUPPORT SYSTEM

FIELD OF THE INVENTION

The present invention relates generally to a support system for supporting a load. More particularly, the present invention relates to an engine support system that enables supporting and balancing loads, such as an engine or vehicle drive train, particularly where the support system is positioned on sloping surfaces.

BACKGROUND OF THE INVENTION

Various engine support bars or systems are known, such as the OTC1722, the OTC1724, the Astro AST5820, the Astro 7900, the Norco 78095A, the Norco 78096A, the Norco 7096A1, and the Sunex SUN5207, for example.

However, many of the conventional support bars or systems typically require the use of tools to attach and remove the support arm or arms, which can increase the time for assembly or removal of the support bar, such as during positioning on or removing from a vehicle. Also, many conventional support systems, such as for positioning on a vehicle, do not easily accommodate positioning of the support bar or system on a sloping surface, such as on sloping fenders of a vehicle.

Accordingly, it is desirable to provide a support system, and more particularly an engine support system, that enables the system to be relatively easily attached and removed, such as from a vehicle, without or with a minimum amount of tools. Also, is desirable to provide a support system that enables relatively fast and easy placement on or removal from a device or structure, such as a vehicle, during use or setup of the system.

Further, it is desirable to provide a support system that enables range of adjustment with relative ease to accommodate varying range of widths, slopes and angles for positioning, such as for use with various vehicles.

SUMMARY OF THE INVENTION

The foregoing needs are met, to a great extent, by the present invention, wherein, according to aspects of the invention, a support system, such as for supporting an engine or transmission of a vehicle, enables ease of assembly and disassembly within a relatively short period of time and with a relatively minimum of tools.

The tubular support arms or members, according to aspects of the invention, provide support for off-center loads using adjustable hook supports and cables. The tubular support members, according to aspects of the invention, assist in enabling use of selectively adjustable base support members to adjust the support system for a range of different widths to position the support system on various structures, such as on a plurality of vehicles. Further, according to aspects of the invention, the hook support members are adjustable along the length and around the axis of the main and auxiliary tubular support members to enable supporting various loads, such as various engines and transmissions of vehicles.

Also, according to aspects of the invention, the tubular main and auxiliary support members provide a naturally self-balancing effect where positioned on sloping surfaces, such as vehicle fenders, to promote preventing support bar roll-over. Additionally, according to aspects of the invention, the main and auxiliary tubular support members can be of a unitary construction to promote reducing the amount of deflection under load, and also to facilitate adjusting and positioning of the support system to accommodate various or differing structure sizes, or widths, such as for various vehicles.

Further, according to aspects of the invention, the base support members enable positioning and adjustment of the support system, to promote minimizing or reducing a need to adjust the entire support system, where transitioning from being used on one structure to another structure, such as from one vehicle to another vehicle. Also, according to aspects of the invention, the selectively adjustable hook support members promote ease of adjustment over a range of positions, including horizontal and vertical translational and rotational adjustments to accommodate various loads associated with structures, such as to accommodate motors or transmissions of various vehicles.

In accordance with an embodiment and aspects of the invention, a support system is provided that includes a main tubular member, one or more base support members located on the main tubular member, the one or more base support members to selectively move and position along the main tubular member to support the support system on a structure. The support system further includes one or more hook support members located on the main tubular member, the one or more hook support members to selectively move and position along the main tubular member to communicatively engage with a load associated with the structure.

In accordance with another embodiment and aspects of the invention, the above described support system further includes an auxiliary tubular member including an engaging member to selectively engage with the main tubular member in a substantially transverse relation, the auxiliary tubular member being selectively positioned along the main tubular member.

The above described support system further includes at least one base support member located on the auxiliary tubular member, the base support member to selectively move and position along the auxiliary tubular member to support the support system on the structure. Also, the support system includes at least one hook support member located on the auxiliary tubular member, the hook support member to selectively move and position along the auxiliary tubular member to communicatively engage with a load associated with the structure.

In accordance with yet another embodiment and aspects of the invention, a support system is provided that includes a main means for supporting a load associated with a structure. The support system also includes one or more first support means for supporting the support system on the structure, the one or more first support means to selectively freely move and position along the main means. Further, the support system includes one or more second support means for communicatively engaging with the load associated with the structure, the one or more second support means to selectively freely move and position along the main means.

In accordance with yet a further embodiment and aspects of the invention, the above described support system further includes an auxiliary means for supporting the load associated with the structure in association with the main means, the auxiliary means having an engaging means to selectively freely engage the auxiliary means with the main means in a substantially transverse relation to selectively freely position the auxiliary means along the main means.

The above described support system further includes at least one of the first support means to selectively freely move and position along the auxiliary means, and includes at least one of the second support means to selectively freely move and position along the auxiliary means.

In accordance with yet still another embodiment and aspects of the invention, a method of supporting a load associated with a structure is provided that includes selectively freely moving and positioning along a main support member one or more base support members to support the support system on a structure, and engaging the one or more base support members selectively positioned on the main support member with the structure.

The method further includes selectively freely moving and positioning along the main support member one or more hook support members. The method also includes communicatively engaging a load associated with the structure with the one or more hook support members selectively positioned on the main support member to support the load associated with the structure.

In accordance with yet a further another embodiment and aspects of the invention, the above described method of supporting a load associated with a structure further includes selectively freely engaging along a main support member an auxiliary support member in a substantially transverse relation. The method also includes selectively freely moving and positioning along the auxiliary support member at least one base support member to support the support system on the structure.

The method also includes engaging the at least one base support member selectively positioned on the auxiliary support member with the structure. The method additionally includes selectively freely moving and positioning along the auxiliary support member at least one hook support member. Further, the method includes communicatively engaging a load associated with the structure with the at least one hook support member selectively positioned on the auxiliary support member to support the load associated with the structure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
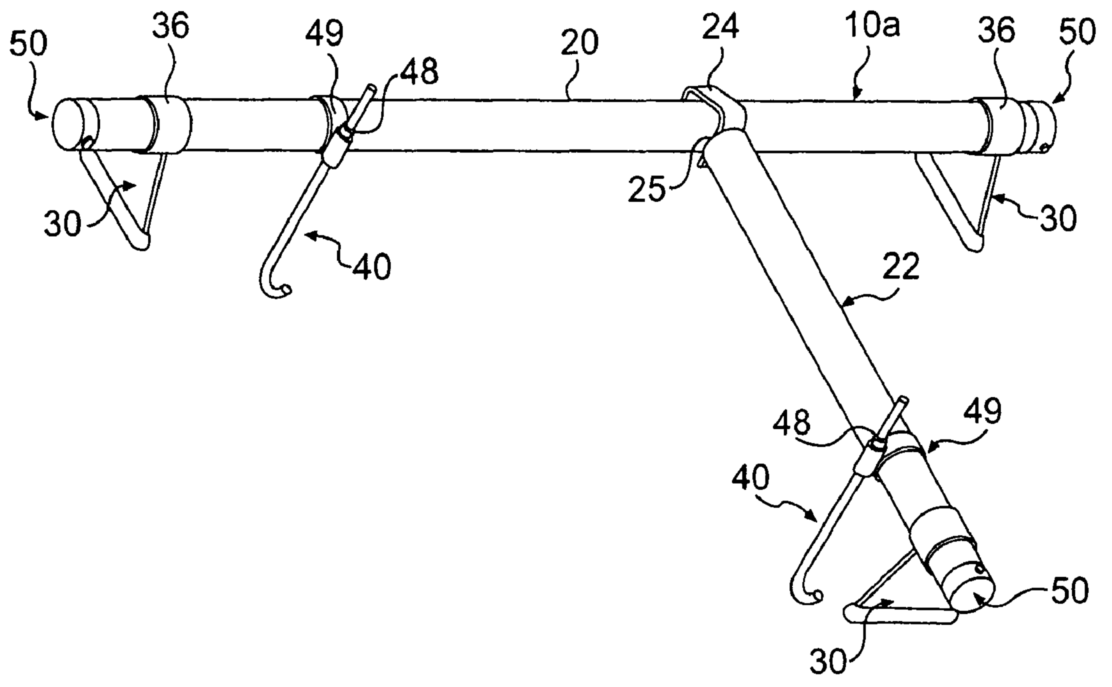
FIG. 1 is a perspective view illustrating an embodiment of a support system, according to aspects of the invention.

The invention will now be described with reference to the drawing figures, in which like reference numerals refer to like parts throughout. Various embodiments, according to aspects of the invention, provide support systems, such as for supporting an engine or transmission of a vehicle, which enables ease of assembly and disassembly within a relatively short period of time with a relatively minimum of tools and with relatively few components for assembly.

An embodiment of a support system, according to aspects of the invention, is illustrated in FIG. 1. FIG. 1 is a perspective view illustrating an embodiment of a support system **10*a*, such as for an engine or transmission of a vehicle, according to aspects of the invention. Support system 10*a* includes a main tubular member 20 and an auxiliary tubular member 22 in selective engaging relation with the main tubular member 20 by an engaging member 24. The engaging member 24 is joined to the auxiliary tubular member 22 by a suitable fastener 25**, such as welding, epoxy type cement, riveting, screws, nuts and bolts, or other suitable fastener.

The support system **10*a* further includes a plurality of selectively moveable base support members 30, with three selectively freely moveable base support members 30 being illustrated in FIG. 1. The base support members 30 are selectively respectively positioned along the main tubular member 20 and the auxiliary tubular member 22 to selectively locate and position the support system 10*a*** on a structure, such as a vehicle.

Further, the support system **10*a* includes a plurality of selectively adjustable and freely moveable hook support members 40 to engage and support a load associated with a structure, such as an engine or transmission of a vehicle, in conjunction with the main and auxiliary tubular members 20 and 22 and the base support members 30. End caps 50 are selectively positioned at the outer ends of the main and auxiliary tubular members 20 and 22**.

Figure 2:
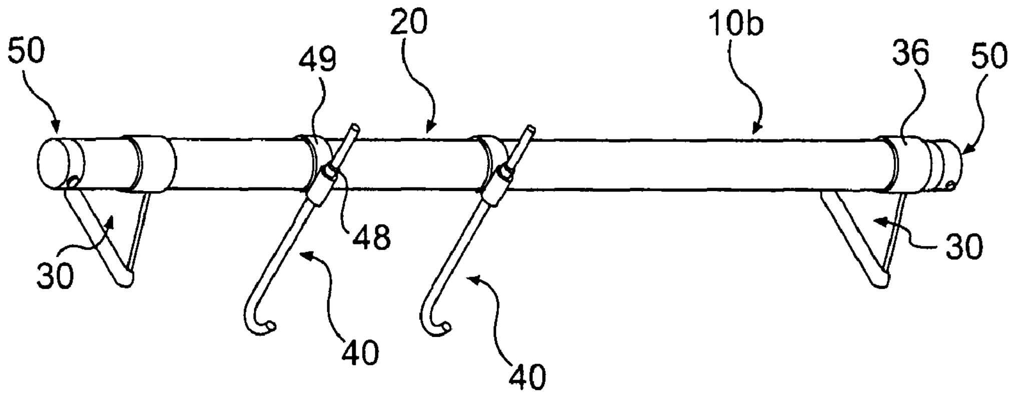
FIG. 2 is a perspective view illustrating a further embodiment of a support system, according to aspects of the invention.

FIG. 2 is a perspective view illustrating another embodiment of a support system 10*b*, such as for an engine or transmission of a vehicle, according to aspects of the invention. Support system 10*b* includes the main tubular member 20, but does not include an auxiliary tubular member.

The support system 10*b* further includes a plurality of selectively freely moveable base support members 30, with two selectively moveable base support members 30 being illustrated in FIG. 2. The base support members 30 are selectively respectively positioned along the main tubular member 20 to selectively locate and position the support system 10*b* on a structure, such as a vehicle.

Further, the support system 10*b* includes a plurality of selectively adjustable freely moveable hook support members 40 to engage and support a load associated with a structure, such as an engine or transmission of a vehicle, in conjunction with the main tubular member 20 and the base support members 30. End caps 50 selectively positioned at the outer ends of the main tubular member 20.

The main and auxiliary tubular support bars, or members, 20 and 22 are of a suitable shape and configuration, such as a round, circular or oval cross tube configuration, for example, although the invention is not limited in this regard. Each of the main and the auxiliary tubular members 20 and 22 are typically integrally formed from a single piece of tubular stock material, such as of a round, circular or oval configuration, for example. Further, the main and auxiliary tubular members 20 and 22 are formed of a suitable material depending upon the use of application, such as various steels or stainless steels, for example. Further, according to aspects of the invention, the main and auxiliary tubular members 20 and 22 can, for various applications, be formed from standard steel shapes and stock sizes, promoting economical manufacturing of the support systems.

Integrally forming each of the main and auxiliary tubular members 20 and 22, such as of a single tubular stock material, assists in enabling the base support members 30 and the adjustable hook support members 40 being selectively freely adjustable and selectively freely positioned along substantially the length of the respective main and auxiliary tubular members 20 and 22. Also, integrally forming each of the main and auxiliary tubular members 20 and 22, such as of a single tubular stock material, likewise assists in enabling the base support members 30 and the adjustable hook support members 40 being selectively rotationally positioned around the axis or outer surface of the corresponding main and auxiliary tubular members 20 and 22.

Further, integrally forming of each of the respective main and auxiliary tubular members 20 and 22 promotes reducing the amount of deflection under load, according to aspects of the invention. Also, the tubular cross section, such as a circular or cylindrical cross section, for the main and auxiliary tubular members 20 and 22 provides a naturally self-balancing effect for sloped surfaces of structures, such as sloped fenders of vehicles, to assist in preventing support bar rollover. Further, the main and auxiliary tubular members 20 and 22 promote increased stability of support systems, such as the support systems 10*a* and 10*b*, while positioned on a structure, such as a vehicle, especially those with sloped surfaces on which the support system is positioned, to minimize the occurrence of rollover, where the support system is under load.

The main and auxiliary tubular members 20 and 22 in the support system 10*a* of FIG. 1 provide a plurality of support points for supporting the support system on a structure, such as a three point support for the support system through three base support members 30, according to aspects of the invention. Also, the main tubular member 20 of the support system 10*b* of FIG. 2 likewise provides a plurality of support points for supporting the support system on a structure, such as two point support for the support system through two base support members 30, according to aspects of the invention.

The selectively freely adjustable two and three point support for the support system, according to aspects of the invention, such as provided by the respective support systems 10*a* and 10*b*, assist in supporting off-center loads, in conjunction with using the adjustable hook support members 40. The hook support members 40 communicatively engage a portion of the structure supporting a load, or engage the load, or engage with attaching ends or members of a sling member, such as a braided steel cable, positioned around a load, such as an engine or transmission of a vehicle.

Additionally, tubular, such as a circular, cylindrical or oval configuration or shape, of the cross section of the main and auxiliary tubular members 20 and 22, further enables the hook support members 40 to support the weight of a load, such as an engine or transmission of a vehicle, at an appropriate or suitable angle or angles by selective rotation about the corresponding main or auxiliary tubular member 20 and 22.

Further, dimensions pertaining to the cross section and length of the auxiliary tubular member 22, or cross tube, and the main tubular member 20, or support arm tube, are determined in view of the specific use or application, such as to meet requirements for size and loading. For example, the cross sectional dimensions and length of the main tubular member 20 and the auxiliary tubular member 22 are determined in order to fit the size parameters of the structure, such as of various vehicles, with consideration being given to loading conditions caused by the load, such as an engine or transmission, and resultant stresses in the supporting components, as well as the mounting configuration and expected loading conditions for the support system.

Figure 3A:
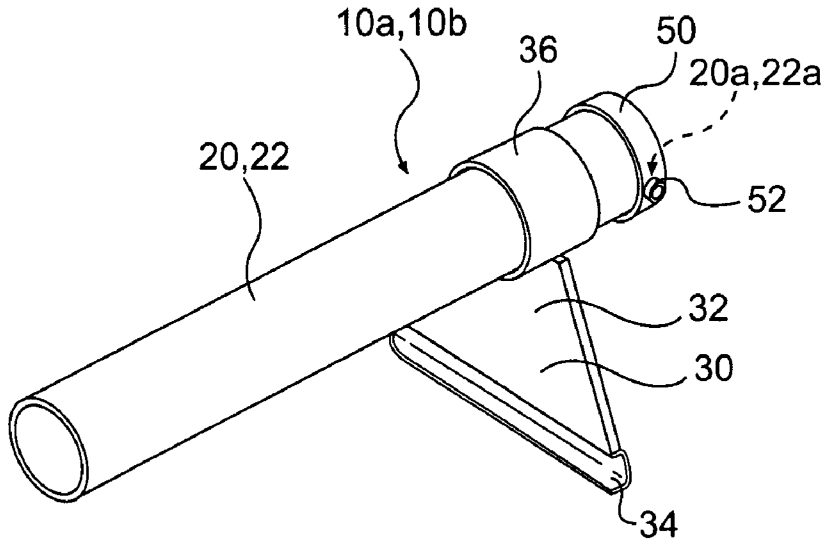
FIG. 3A is perspective front view of a base support member and associated base sliding member and an end cap positioned in engaging relation with a main tubular member or an auxiliary tubular member, according to aspects of the invention.
Figure 3B:
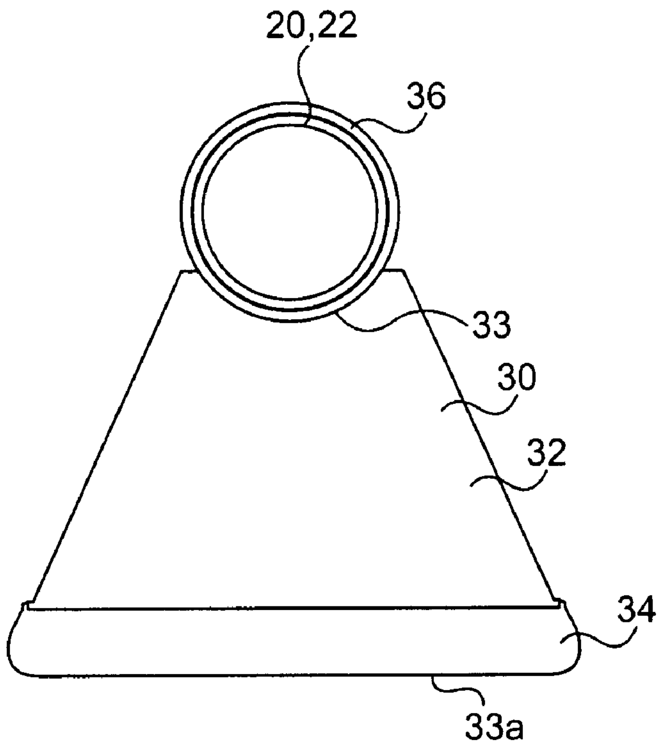
FIG. 3B is a perspective side view of the base support member and associated base sliding member in engaging relation with the main tubular member or the auxiliary tubular member, according to aspects of the invention.
Figure 3C:
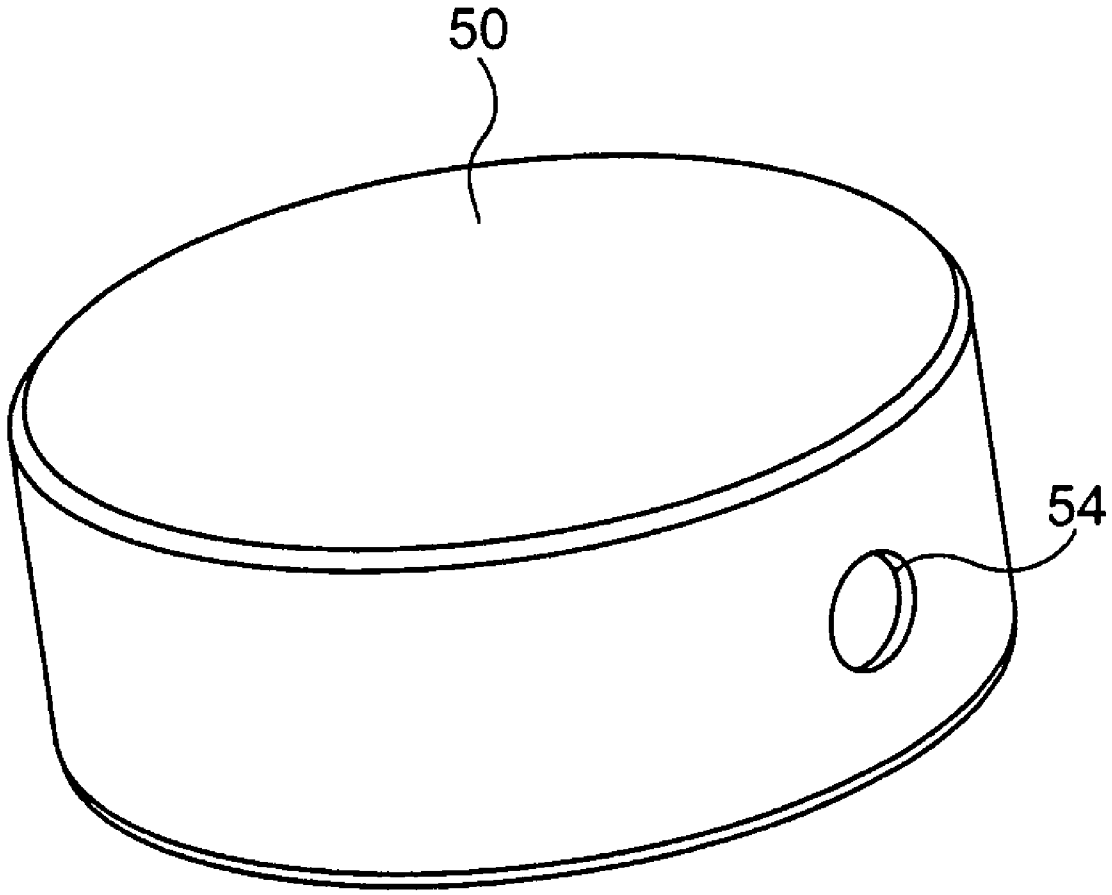
FIG. 3C is a perspective view of an end cap for positioning at an end of the main tubular member or an end of the auxiliary tubular member, according to aspects of the invention.

Referring now to FIGS. 3A through 3C, FIGS. 3A and 3B are respectively a perspective front view and a side view of a base support member 30 and end caps 50 positioned in engaging relation with a main tubular member 20 or an auxiliary tubular member 22 of a support system 10*a* or 10*b*, according to aspects of the invention. FIG. 3C is a perspective view of the end cap 50 for positioning at an end of the main tubular member 20 or an end of the auxiliary tubular member 22, according to aspects of the invention.

The base support members 30 includes a load distributing member or plate 32, a base sliding member 36, and a support base 34. The load distributing member 32 is of a generally trapezoidal configuration, or other suitable configuration, and is formed of a suitable material, such as various steel or stainless steels, for example. The top surface 33 of the load distributing member 32 is configured to conform to a configuration of a base sliding member 36, such as including a generally curved surface configuration.

The base sliding member 36 is of a configuration conforming to the main tubular member 20 or the auxiliary tubular member 22, such as a generally circular, cylindrical or oval configuration, for example, on which the base sliding member 36 is positioned. The sliding member 36 is of a size or dimensions to selectively freely slide or move along the length of the main or auxiliary tubular members 20 or 22 to selectively position and engage the corresponding base support member 30 at a plurality of predetermined positions along the length of the main or auxiliary tubular members 20 or 22. The sliding member 36 is likewise formed of a various steels or stainless steels, for example, and is joined to the load distributing member 32 in a suitable manner, such as by welding, epoxy type cement, riveting, screws, nuts and bolts, or other suitable fasteners.

The support base 34 of the base support member 30 is suitably attached to or formed on the load distributing member 32. The support base 34 can be formed of a boot type structure that is positioned on a base surface 33*a* of the base support member 30, or can be formed on the load distributing member 32 in the area of the base surface 33*a*. The support base 34 is formed of a suitable material or composition to engage with or resist movement on a surface of a structure on which the support system, such as support systems 10*a* and 10*b*, is positioned, such as a fender, or other surface, of a vehicle. The boot type structure or coating material forming the support base 34, can be, for example, a rubber or plastic type material, such as a PVC type material or a PVC plastisol dip coating, for example.

The support system, such as support systems 10*a* and 10*b*, according to aspects of the invention, provide for adjustability of the base support member 30, or support feet, themselves, rather than the entire support system, for various uses and applications, to enable ease of use of the support system. Also, according to aspects of the invention, the sliding members 36 of the base support members 30 enable both selective rotational movement about the main or auxiliary tubular members 20 and 22, or support tubes, and horizontal translational movement along the length of the main or auxiliary tubular members 20 and 22, or support tubes.

The base support members 30, according to aspects of the invention, are freely adjustable and movable to enable placing the support system, such as support systems 10*a* and 10*b*, securely on a surface of a structure, such as on a surface or surfaces of a vehicle being serviced. The adjustable base support members 30, according to aspects of the invention, are selectively positioned at a plurality of predetermined positions along the length of the main or auxiliary tubular members 20 and 22 to enable accommodating various structures, such as different vehicle sizes, as well as promoting ease of use for different mounting configurations.

End caps 50 are positioned on and cover the outer ends of the main and auxiliary support members 20 and 22 to prevent the sliding members 36 of the base support members 30 and the adjustable hook support members 40 from unintentional removal during transporting, positioning or operating of the support system, such as support systems 10*a* and 10*b*. End caps 50 also assist in protecting the inside of the main and auxiliary tubular members 20 and 22, such as from debris and moisture, as well as enhancing the appearance of the support system.

End caps 50 are formed of various steels or stainless steels, as well as of a rubber, plastic type material, or other suitable materials. The end caps 50 can include an aperture 54 into which a securing member 52, such as a screw, bolt or plug can be inserted to assist in securing the end cap 50 at a corresponding end of the main or auxiliary tubular member 20 or 22. The main or auxiliary tubular member 20 or 22 can also include an aperture 20*a* or 22*a* in which to receive the securing member 52. The securing member 52 can be of any various suitable member and materials, such as various bolts, screws, and plugs of metallic, rubber or plastic type materials, for example.

Figure 4A:
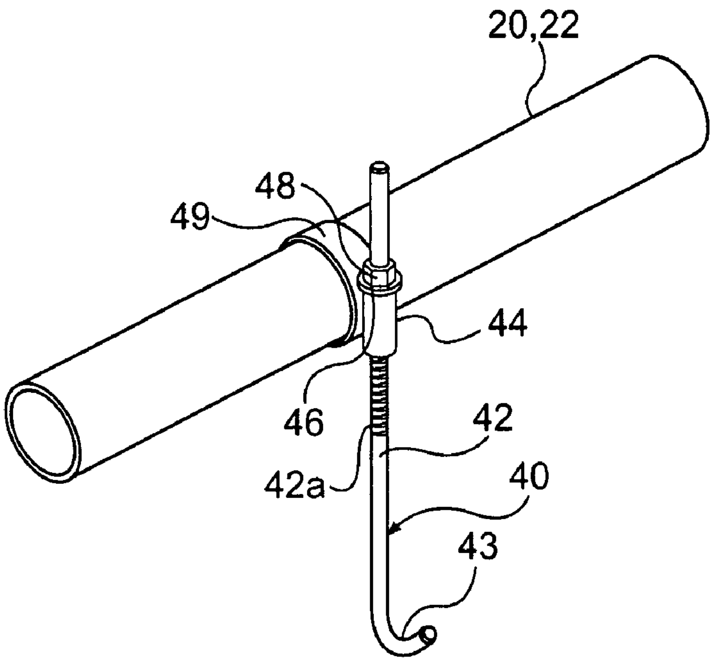
FIGS. 4A and 4B are perspective front views and FIG. 4C is a perspective side view of a selectively adjustable hook support member and associated hook sliding member, with FIGS. 4B and 4C illustrating an adjustment member of the hook support member and associated adjusting tool, according to aspects of the invention.
Figure 4B:
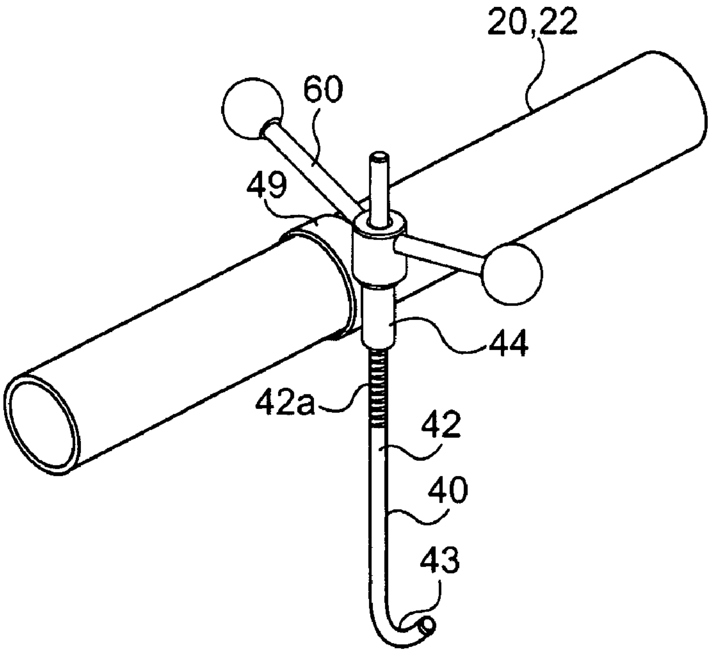
Figure 4C:
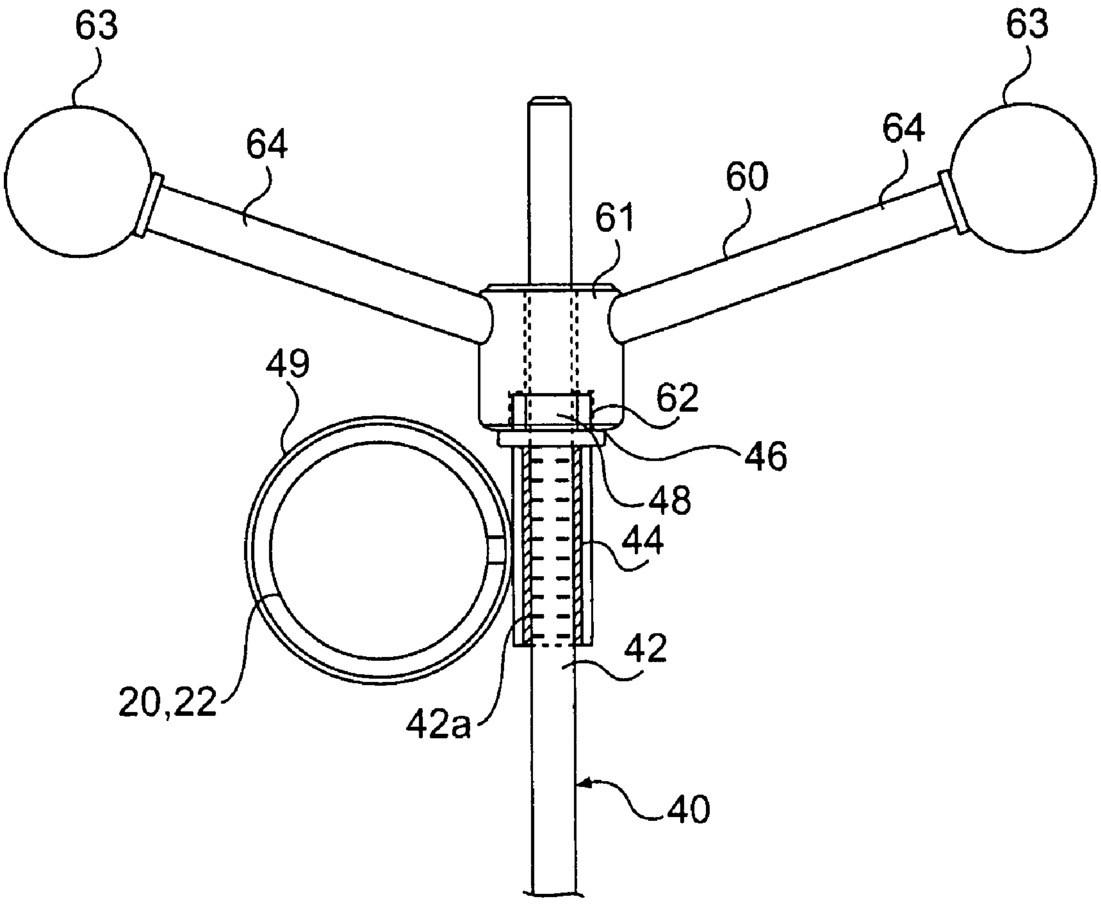

FIGS. 4A and 4B are perspective front views and FIG. 4C is a perspective side view of a selectively adjustable hook support member 40 and associated hook sliding member 49, with FIGS. 4A and 4C illustrating a hook adjustment member 48 of the hook support member 40 and associated hook adjusting tool 60, according to aspects of the invention. The support systems, according to aspects of the invention, include a plurality of hook support members 40, with two hook support members 40 being illustrated in the support systems of FIGS. 1 and 2, although the invention is not limited in this regard.

The hook support member 40 includes a hook member 42, such as a J-hook, for example, having an engaging hook or engaging portion 43 to engage with a structure or with an attachment end of a supporting sling 70 (FIG. 6) that engages the load associated with a structure to be supported, such as an engine or transmission of a vehicle. The hook member 42 can also have a threaded portion 42*a*, or other suitable arrangement, to communicate with the adjustment member 48 of the hook support member 40 to adjustably raise and lower the hook member 42 to a plurality of positions to provide for generally vertical translational movement of the hook member 42.

The hook support member 40 includes a sleeve member 44 that receives therein the hook member 42. The sleeve member 44 is joined to the hook sliding member 49 in a suitable manner, such as by welding, epoxy type cement, riveting, screws, nuts and bolts, or other suitable fasteners. The hook member 42, the sleeve member 44 and the hook sliding member 49 are formed of various steels or stainless steels, or other suitable materials, for example.

The hook sliding member 49 is of a configuration conforming to the main tubular member 20 or the auxiliary tubular member 22, such as a generally circular or cylindrical configuration, on which the hook sliding member 49 is positioned. The hook sliding member 49 can provide for generally horizontal translational and rotational movement of the hook support member 40 and can accommodate varying directions of force applied to the support system in use or operation.

The hook sliding member 49 is of a size or dimensions to selectively freely slide or freely move along the length of the main or auxiliary tubular members 20 and 22 to selectively position and engage the corresponding hook support member 40 at a plurality of predetermined positions along the length of the main or auxiliary tubular members 20 and 22. A tubular configuration, such as a circular, cylindrical or oval configuration, as well as an integral, such as a single piece, construction, of each of the main or auxiliary tubular members 20 and 22, according to aspects of the invention, assists in enabling the hook sliding members 49 to be selectively positioned with ease along the length of the main or auxiliary tubular members 20 and 22.

The adjustment member 48 is positioned in communicating relation with the hook member 42, such as by communicating with the threaded portion 42*a* to selectively raise and lower the hook member 42 to provide for generally vertical translational movement of the hook member 42. The adjustment member 48 can be a threaded nut, a threaded sleeve member or other suitable structure, for example, which engages or communicates with the hook member 42.

The adjustment member 48 assists in raising or lowering the hook member 42 to a plurality of predetermined positions. The adjustment member 48 also enables the engaging hook or engaging portion 43 to engage a portion of the structure supporting a load, or to engage the load, or to engage with attaching ends or members of the sling member 70 (FIG. 6) where positioned around a load, such as an engine or transmission of a vehicle.

Also, according to aspects of the invention, hook support member 40 can include a retaining member 46 in communicating relation with the adjustment member 48 and the sleeve member 44. The retaining member 46 assists in maintaining the position of the hook member 42 and assists in supporting a load. The retaining member 46 can be a generally ring or annular type structure, such as a washer, for example.

The retaining member 46 can be made of various steels or stainless steels, rubber, plastic, phenolic, or other suitable materials, or combinations thereof. Moreover, according to aspects of the invention, the retaining member 46 can be an oil impregnated thrust washer, for example. The oil impregnated thrust washer, such as a retaining member 46, can provide one or more bearing surfaces, such as formed between the sleeve 44 and the retaining member 46 and between the adjustment member 48 and the retaining member 46, where the heat created by the surface friction draws the oil to the bearing surface, to promote reducing wear and increasing resistance to shock loads on the support system, such as support systems 10*a* and 10*b*, for example.

To assist with the adjustment of the hook member 42, support systems 10*a* and 10*b*, according to aspects of the invention, can also include an adjustment tool 60 to selectively adjust the hook member 42 to one or more of a plurality of vertical translational positions. The adjustment tool 60 can be a removable T-type handle, such as illustrated in FIGS. 4B and 4C, for example, to enable vertical translational position adjustments of the hook member 42 in a relatively short time period.

The adjustment tool 60 of FIGS. 4B and 4C includes a socket member 61 having a socket 62 that is of a shape and configuration to selectively receive, engage and operate the adjustment member 48 to position the hook member 42 of the hook support member 40 to communicatively engage with a load associated with a structure. The adjustment tool 60 has a pair of opposing handle members 64 extending from the socket member 61 with gripping ends 63 to enable turning of the adjustment member 48 through engagement with the socket 62.

The adjustment tool 60, such as a T-handle, is formed of various steels, stainless steels, or other suitable material, with the gripping ends 63 being of a rubber, plastic, phenolic or other suitable material. The removable adjustment tool 60, according to aspects of the invention, enables ease of placement of the adjustment tool 60 on the adjustment member 48, ease and relative speed of adjustment of the vertical translational position of the hook member 42, and the ease and relative speed to remove the adjustment tool 60 to minimize interference with access to areas being serviced.

Figure 5A:
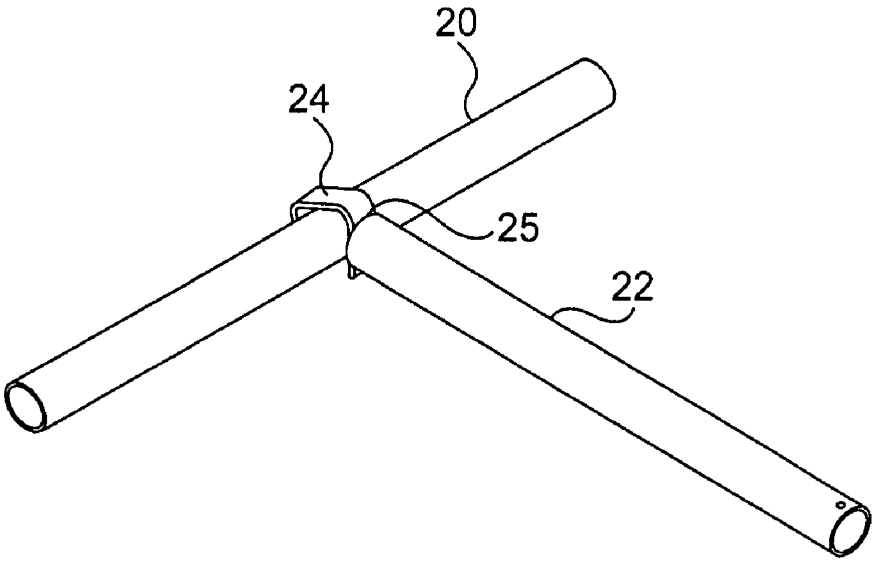
FIGS. 5A and 5B are front and side perspective views of an auxiliary tubular member having an engaging member in engaging relation with a main tubular member, according to aspects of the invention.
Figure 5B:
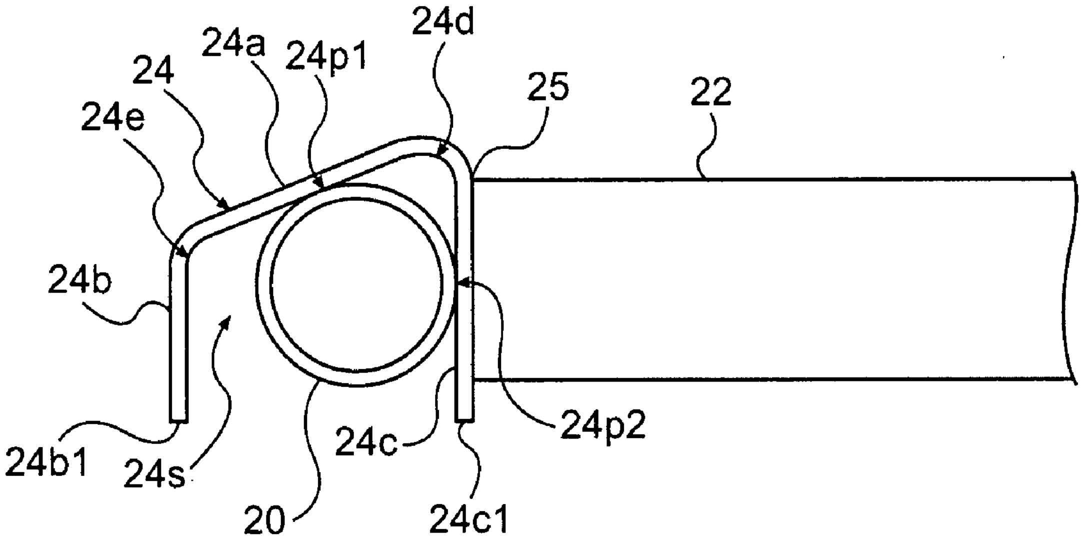
Figure 5C:
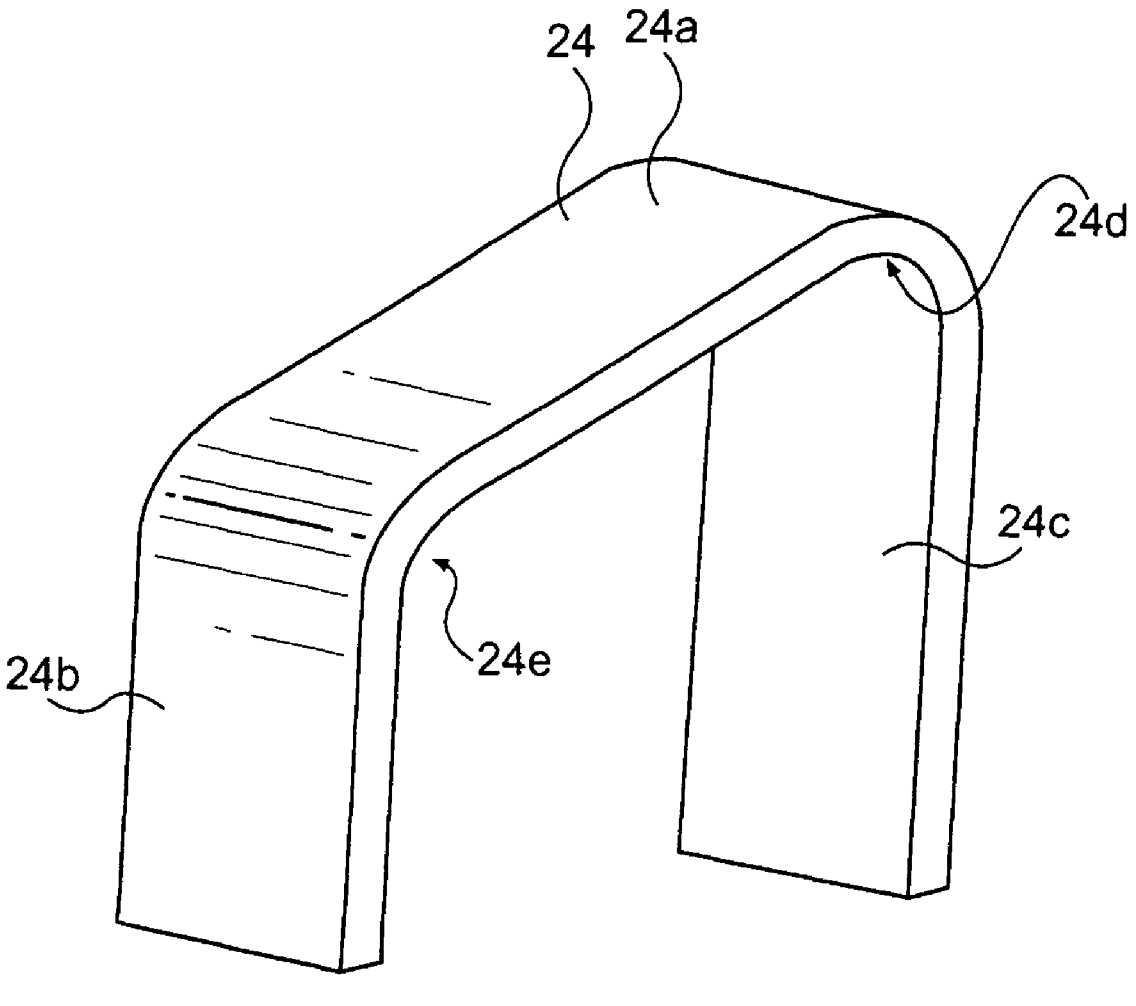
FIG. 5C is a perspective view of the engaging member of the auxiliary tubular member, according to aspects of the invention.

Continuing with reference to FIGS. 5A through 5C, FIGS. 5A and 5B are front and side perspective views of the auxiliary tubular member 22 having an engaging member 24 in engaging relation with the main tubular member 20 as in the support system 10*a* of FIG. 1, according to aspects of the invention. FIG. 5C is a perspective view of the engaging member 24, according to aspects of the invention.

The engaging member 24 is joined to an end 25 of the auxiliary tubular member 22 in a suitable manner, such as by welding, epoxy type cement, riveting, screws, nuts and bolts, or other suitable fasteners. The engaging member 24 is formed of a generally U-shaped configuration, although the invention is not limited in this regard. Also, the engaging member 24 is formed of various steels or stainless steels, or other suitable materials, for example.

The engaging member 24 has a sloping top section 24*a*, a front section 24*b* and a rear section 24*c*. The top section 24*a* adjoins the rear section 24*c* through a rounded rear corner section 24*d* and adjoins the front section 24*b* through a rounded front corner portion 24*e*. An aperture 24*s* is formed within the engaging member 24 to receive the main tubular member 20. As illustrated in FIGS. 5B and 5C, according to aspects of the invention, the front section 24*b* is arranged in substantially parallel relation to the back section 24*c*. Also, the front section 24*b* is of a shorter length than the rear section 24*d*, with a lower end 24*b*1 of the front section 24*b* being substantially aligned with a lower end 24*c*1 of the rear section 24*c*, although the invention is not limited in this regard.

The engaging member 24 enables the auxiliary tubular member 22 be selectively attached and removed, or assembled and disassembled, from the main tubular member 20 without or with minimal use of tools. The configuration of the engaging member 24 enables the auxiliary tubular member 22 to be easily placed on or removed from the device during use or setup of the support system, such as support system 10*a*, without the need to disassemble any other components of the support system.

Further, the engaging member 24 enables the auxiliary tubular member 22 to be selectively freely adjustable along the length of the main tubular member 20. Such positioning can assist in accommodating varying widths of structures, such as vehicles, on which the support system is positioned, as well as to accommodate positioning at varying angles. Further, as illustrated in FIG. 5B, the sloping top section 24*a*, the generally upright front an rear sections 24*b* and 24*c* and the receiving aperture 24*s*, assist in enabling the main tubular member 20 to be received and retained in engaging relation with the engaging member 24, such as at engaging points 24*p*1 on the top section 24*a* and 24*p*2 on the rear section 24*d*.

Additionally, according to aspects of the invention, the configuration of the engaging member 24 can assist in enabling rotational movement and translational movement of the auxiliary tubular member 22 along the length of the main tubular member 20, such as to accommodate varying loads, such as varying widths of vehicle engines. The configuration or shape of the engaging member 24, as described, can enable the engaging member 24 to be positioned in engaging relation with the main tubular member 20, at corresponding engaging points, such as engaging points 24*p*1 and 24*p*2, for example, even on steeply sloped structures, such as steeply sloped fenders of vehicles. The clearance provided by the aperture 24*s* between the main tubular member 20 and engaging member 24 likewise assists in enabling a degree of rotation of the auxiliary tubular member 22 about the main tubular member 20.

Figure 6:
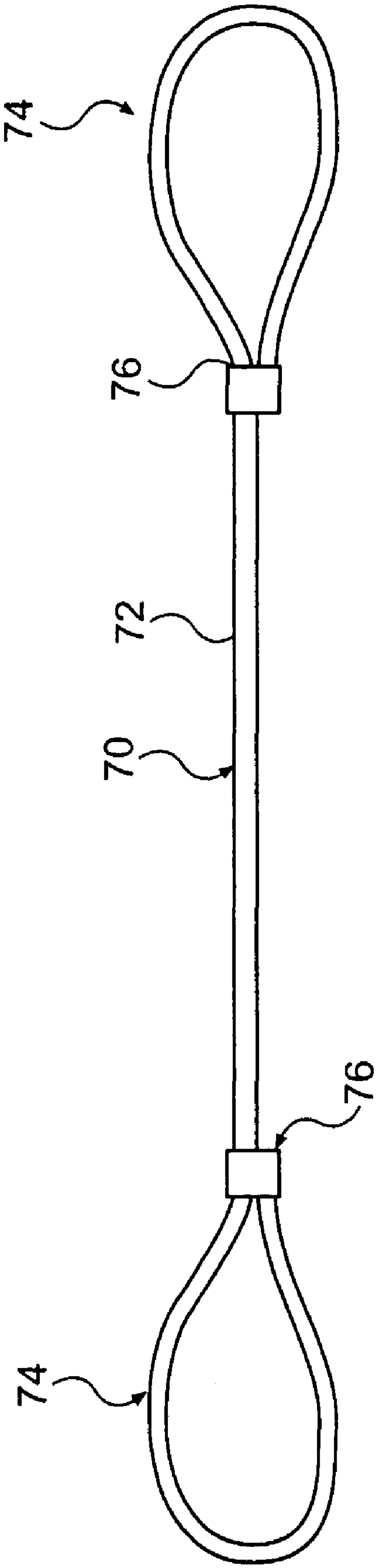
FIG. 6 is a perspective view of a sling member having attachment members for engaging with the hook support members to support a structure, such as an engine, according to aspects of the invention.

FIG. 6 is a perspective view of the sling member 70 having attachment members 74 for respectively engaging with the engaging hooks or engaging portions 43 of a pair of the hook support members 40 to support a load associated with a structure, such as an engine or transmission of a vehicle, according to aspects of the invention. The sling member 70 includes a flexible supporting member 72, such as a galvanized steel wire rope or a braided steel cable, for example, which can also form part of the attachment members 74.

The flexible supporting member 72 can be any of various suitable materials, depending upon the use and application, such various steels, rope or plastic type materials, for example. The attachment members 74 can be formed from and as a part of the flexible supporting member 72 with a clamping member 76, such as an acco-press wire rope end or other suitable fastener or binder. The clamping member 76 engages a corresponding end of the flexible supporting member 72 and another portion of the flexible supporting member 72 to form the attachment members 74, although the invention is not limited in this regard. Also, a clamp, or other fastener, can be suitably attached to an end of the flexible supporting member 72 to form an attachment member 74, such a by welding, for example.

Figure 7:
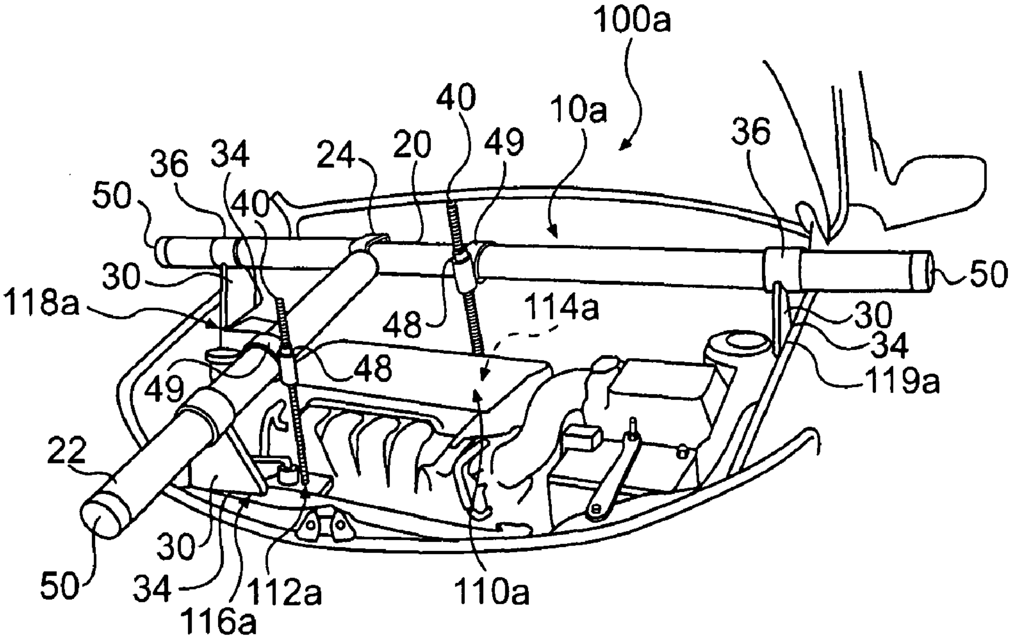
FIG. 7 is a perspective view of the support system of FIG. 1 supporting a structure, such as an engine of a vehicle, according to aspects of the invention.

FIG. 7 is a perspective view of the support system 10*a* of FIG. 1 supporting a load associated with a structure, such as an engine 110*a* of a vehicle 100*a*, according to aspects of the invention. In FIG. 7, the auxiliary tubular member 22 is positioned and adjusted on the main tubular member 20. In positioning the support system 10*a* on the vehicle 110*a*, the sliding members 36 are adjusted on the main tubular member 20 and the auxiliary tubular member 22. The sliding members 36 are positioned and adjusted so that the support bases 34 of the base support members 30 are respectively supported on surfaces 118*a* and 119*a* of the fenders and on a surface 116*a* of the engine compartment of the vehicle 100*a*.

The hook sliding members 49 and the adjustment members 48 of the hook support members 40 are then adjusted and positioned to engage the engaging portions 43 of the hook members 42 with supporting surfaces 112*a* and 114*a* of the engine 110*a* to support the engine 110*a*, as an example of a load associated with a structure, to perform a procedure or operation.

Where the procedure or operation is completed, the adjustment members 48 are adjusted to disengage the engaging portions 43 from the supporting surfaces 112*a* and 114*a* of the engine 110*a*. The support system 10*a* is then removed from the vehicle 100*a*. Also, according to aspects of the invention, the sling member 70 can also be used to support the engine 110*a*, or other suitable load associated with a structure, to perform a procedure or operation on the vehicle 100*a* with the support system 10*a*.

Figure 8:
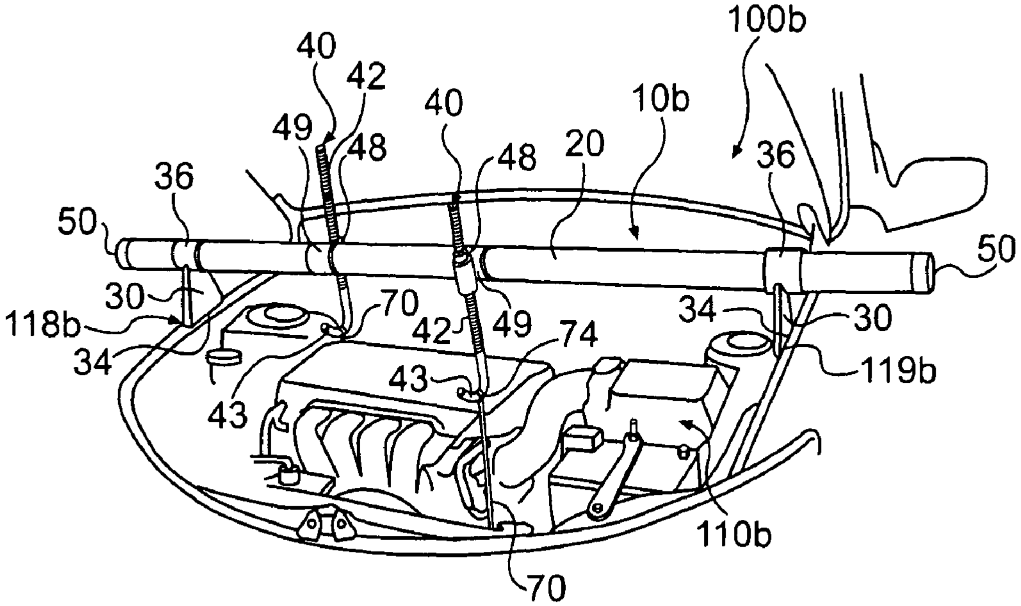
FIG. 8 is a perspective view of the support system of FIG. 2 supporting a structure, such as an engine of a vehicle, according to aspects of the invention.

FIG. 8 is a perspective view of the support system 10*b* of FIG. 2 supporting a load associated with a structure, such as an engine of a vehicle 100*b*, according to aspects of the invention. In FIG. 8, in positioning the support system 10*b* on the vehicle 110*b*, the sliding members 36 are adjusted on the main tubular member 20 so that the support bases 34 are respectively supported on the surfaces 118*b* and 119*b* of the fenders of the vehicle 100*b*.

The hook sliding members 49 of the hook support members 40 are then positioned and adjusted on the main tubular member 20. The sling member 70 is then positioned in surrounding relation to the engine 110*b*, as an example of a load associated with a structure, to be supported. The attachment members 74 of the sling member 70 are then positioned in engaging relation with the engaging portions 43 of the hook members 42 of the hook support members 40. The adjustment members 48 of the hook support members 40 are then adjusted to engage the sling member 70 in communicating relation with the engine 110*b* to support the engine 110*b* to perform a procedure or operation.

Where the procedure or operation is completed, the adjustment members 48 are adjusted to move the hook members 42 to disengage the sling member 70 from communicating relation with the engine 110*b*. The sling member 70 is removed from the engaging portions 43 of the hook support members 40 and the support system 10*b* is then removed from the vehicle 100*a*. Also, according to aspects of the invention, the sling member 70 can be omitted and the engaging portions 43 of the hook support members 40 can communicatively engage with one or more surfaces of the load associated with the structure to be supported, such as an engine or transmission of the vehicle 100*b*, to perform a procedure or operation.

Support systems according to aspects of the present invention, such as support systems 10*a* and 10*b*, enable ease of use and operation on various vehicle configurations, including vans and cars with steeply sloped hoods, wider vehicles, and vehicles with relatively heavy engines or transmissions, for example. Also, support systems, according to aspects of the invention, promote ease of installation and use with relatively few components for assembly.

Although various examples of support systems have been shown and described in relation to use and operation with vehicles, such as automobiles and trucks, it will be appreciated that the supports systems and their methods of use and operation can also be applied to other items, such as supporting various structures in marine or avionics applications, or in manufacturing, repair or assembly operations of other types of items. Also, although the support systems are useful to promote ease of assembly and operation to perform various procedures on vehicles, the present invention can also be used to do other things and/or in other industries.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A support system, comprising:

a main tubular member;

one or more base support members located on the main tubular member, the one or more base support members to selectively move and position along the main tubular member to support the support system on a structure; and one or more hook support members located on the main tubular member, the one or more hook support members to selectively move and position along the main tubular member to communicatively engage with a load associated with the structure, wherein the one or more base support members comprise:

a base sliding member, wherein the base sliding member is selectively moveable to position and adjust the base support member in horizontal translational and rotational directions;

a load distributing member coupled with the base sliding member, wherein the load distributing member supports the support system when positioned on the structure; and a support base coupled with the load distributing member, wherein the support base maintains the base support member in engaging relation with a surface of the structure, and wherein the one or more hook support members comprise:

a hook sliding member, wherein the hook sliding member is moveable to selectively position and adjust the hook support member in horizontal translational and rotational directions;

a sleeve member coupled with the hook sliding member; and a hook member positioned within the sleeve member, wherein the hook member includes an engaging portion to communicatively engage with the load.

2. The support system of claim 1, wherein;

the base support members are selectively moveable in one or more of horizontal translational and rotational directions, and the one or more hook support members are selectively moveable in one or more of horizontal translational, vertical translational and rotational directions.

3. The support system of claim 1, wherein the support system further comprises:

one or more end caps positioned in engaging relation with a corresponding end of the main tubular member to cover the corresponding end of the main tubular member.

4. A support system, comprising:

a main tubular member;

one or more base support members located on the main tubular member, the one or more base support members to selectively move and position along the main tubular member to support the support system on a structure;

one or more hook support members located on the main tubular member, the one or more hook support members to selectively move and position along the main tubular member to communicatively engage with a load associated with the structure; and an auxiliary tubular member including an engaging member to selectively engage with the main tubular member in a substantially transverse relation, the auxiliary tubular member being selectively positioned along the main tubular member, wherein at least one base support member located on the auxiliary tubular member, the base support member to selectively move and position along the auxiliary tubular member to support the support system on a structure, wherein at least one hook support member located on the auxiliary tubular member, the hook support member to selectively move and position along the auxiliary tubular member to communicatively engage with the load associated with the structure, and wherein the engaging member is generally U-shaped and is positioned at an end of the auxiliary tubular member, the engaging member selectively engages and disengages the auxiliary tubular member with and from the main tubular member.

5. The support system of claim 4, wherein:

the one or more base support members located on the main tubular member and the auxiliary tubular member are selectively moveable in one or more of horizontal translational and rotational directions, the one or more hook support members located on the main tubular member and the auxiliary tubular member are selectively moveable in one or more of horizontal translational, vertical translational and rotational directions, and the engaging member is selectively moveable in one or more of horizontal translational and rotational directions.

6. The support system of claim 4, wherein:

the base support members comprise:

a base sliding member, wherein the base sliding member is moveable to selectively position and adjust the base support member in horizontal translational and rotational directions;

a load distributing member coupled with the base sliding member, wherein the load distributing member supports the support system when positioned on the structure; and a support base coupled with the load distributing member, wherein the support base maintains the base support member in engaging relation with a surface of the structure, and the hook support members comprise:

a hook sliding member, wherein the hook sliding member is moveable to selectively position and adjust the hook support member in horizontal translational and rotational directions;

a sleeve member coupled with the hook sliding member; and a hook member positioned within the sleeve member, wherein the hook member includes an engaging portion to communicatively engage with the load.

7. The support system of claim 4, wherein the hook support members further comprise:

an adjustment member positioned in engaging relation with a hook member, the adjustment member to selectively position and adjust the hook member in a vertical translational direction.

8. The support system of claim 7, wherein the hook support members further comprise:

a retaining member positioned in engaging relation with the adjustment member and a sleeve member, wherein the sleeve member receives the hook member, and wherein the retaining member includes one or more bearing surfaces to engage with the adjustment member and the sleeve member to resist shock loads on the support system.

9. The support system of claim 8, wherein the retaining member comprises an oil impregnated thrust washer.

10. The support system of claim 7, wherein the support system further comprises:

at least one sling member to selectively engage and disengage with an engaging portion of the hook member of a pair of hook members, the sling member being positioned to engage with the load to support the load.

11. The support system of claim 7, wherein the support system further comprises:

a plurality of end caps positioned in engaging relation with corresponding ends of the main tubular member and an outer end of the auxiliary tubular member to cover the corresponding ends of the main tubular member and the outer end of the auxiliary tubular member.

12. The support system of claim 4, wherein the support system further comprises:

a plurality of end caps positioned in engaging relation with corresponding ends of the main tubular member and an outer end of the auxiliary tubular member to cover the corresponding ends of the main tubular member and the outer end of the auxiliary tubular member.

* * * * *